JOHN J. BRADNER.
Improvement in Grain Separators and Baggers.
No. 125,014. Patented March 26, 1872.
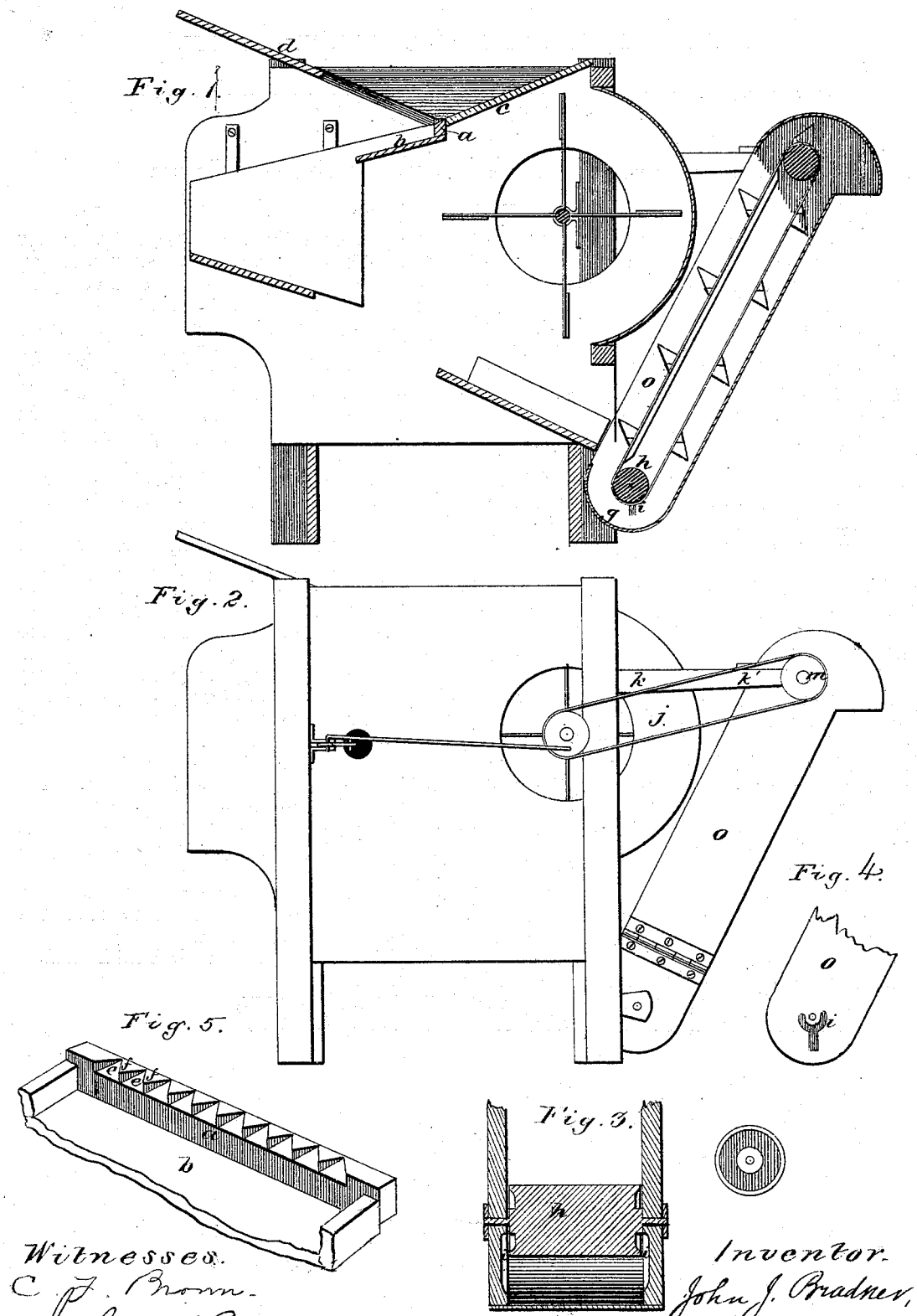

UNITED STATES PATENT OFFICE.

JOHN J. BRADNER, OF PINE CREEK, NEW YORK.

IMPROVEMENT IN GRAIN-SEPARATORS AND BAGGERS.

Specification forming part of Letters Patent No. 125,014, dated March 26, 1872.

Specification describing certain Improvements in Grain-Separators and Baggers, invented by JOHN J. BRADNER, of Pine Creek, Schuyler county, New York.

Figure 1 is a sectional elevation lengthwise of the hopper. Fig. 2 is a side elevation of the whole machine. Fig. 3 is a partial section through the bagger. Fig. 4 is a partial elevation of the inside of the bagger-trunk, showing the grooves $i$; and Fig. 5, a perspective view of the feeder-bar.

This invention relates to an improved feeder-bar for the hoppers of grain-separators, so constructed as to discharge its office of forcing grain through the bottom of the hopper upon the screens without clogging the feeder. It also relates to an improvement in the baggers which are attached to separators, whereby grain is prevented from getting between the inside of the bagger-trunk and the ends of the lower cylinder of the elevator.

Referring to the drawing, $a$ is the aforesaid feeder-bar, the same being attached to the top of the vibratory shoe $b$. The back of the feeder $a$ is placed close to the lower edge of the stationary side $c$ of the hopper; and the top of the feeder is horizontal and flush with the upper corner of the said lower edge, so that no part of the feeder projects upward into the hopper. The corner of the feeder next the movable side $d$ of the hopper is regularly notched, as shown at $e$, the notches extending across the top of the feeder, and forming intermediate teeth $f$. The sides of the teeth or notches are vertical, and the bottoms of the notches are inclined downward so as to give ample vent for the grain. When the side $d$ is raised, and the shoe $b$ vibrated, the teeth $f$ force the contents of the hopper through the opening, and the straws, sticks, &c., pass over the teeth without catching on them, and thus clogging the feeder.

The grain falls from the shoe into the box $g$ at the foot of the bagger-trunk $o$. The lower cylinder $h$ of the elevator is concave at its ends, so that, when the kernels of grain fall between the inside of the trunk and the ends of the cylinder, they enter enlarged spaces and fall to the bottom of the same, and are conducted thence by means of grooves $i$ formed in the sides of the trunk $o$ opposite the ends of the cylinder $h$ and below the journals of the same. The grain falls through the grooves $i$ into the box $g$, whence it is carried up with the rest by means of the elevator-apron. The hollows at the ends of the cylinder and the grooves $i$, therefore, prevent grain from clogging the cylinder.

The cleats $k$ that support the fan-drum $j$ are extended beyond the circumference of the same, as shown at $k'$, and these extensions support the shaft $m$ of the elevator.

I claim as my invention—

1. The feeder-bar $a$, placed flush with the bottom of the hopper, and constructed with teeth $f$ having horizontal upper surfaces, and notches $e$ having slanting bottoms, all as specified.

2. The cylinder $h$, having concave ends, and combined with the grooves $i$ in the sides of the bagger-trunk $o$, as specified.

JOHN J. BRADNER.

Witnesses:
GEO. E. BROWN,
J. E. WERREN.